(12) United States Patent
Kim et al.

(10) Patent No.: US 8,942,273 B2
(45) Date of Patent: Jan. 27, 2015

(54) COMMUNICATION METHOD OF RELAY NODE USING NON-LINEAR HYBRID NETWORK CODING AND DEVICE USING SAID METHOD

(75) Inventors: Kwang Taik Kim, Yongin-si (KR); Vahid Tarokh, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 13/613,134

(22) Filed: Sep. 13, 2012

(65) Prior Publication Data
US 2013/0070813 A1 Mar. 21, 2013

(30) Foreign Application Priority Data
Sep. 16, 2011 (KR) .................... 10-2011-0093574

(51) Int. Cl.
 *H03K 11/00* (2006.01)
 *H04L 27/34* (2006.01)
(52) U.S. Cl.
 CPC ..................... *H04L 27/34* (2013.01)
 USPC ........... 375/214; 375/260; 375/261; 375/298; 375/324; 375/340
(58) Field of Classification Search
 USPC .................. 375/214, 260, 261, 298, 324, 340
 See application file for complete search history.

(56) References Cited

U.S. PATENT DOCUMENTS

| | | | |
|---|---|---|---|
| 2004/0126088 A1* | 7/2004 | Oshima | 386/46 |
| 2005/0152391 A1 | 7/2005 | Effros et al. | |
| 2008/0198952 A1* | 8/2008 | Stirling-Gallacher | 375/340 |
| 2009/0268790 A1 | 10/2009 | Josiam et al. | |
| 2011/0110314 A1 | 5/2011 | Manssour | |

OTHER PUBLICATIONS

Extended European Search Report issued Aug. 19, 2014 in counterpart European Patent Application No. 12182010.4 (4 pages, in English).
Koike-Akino, Toshiaki, Petar Popovski, and Vahid Tarokh. "Optimized Constellations for Two-Way Wireless Relaying with Physical Network Coding." *IEEE Journal on Selected Areas in Communications*, vol. 27 No. 5 (Jun. 2009): pp: 773-787.
Pan, Chengkang et al. "Mapping Codebook-Based Physical Network Coding for Asymmetric Two-Way Relay Channels." *IEEE Communication Society*, (2010): 6 pages.
Wang, Zhiyong, Chao Zhang, and Guo Wei. "Physical-Layer Network Coding with Partial CSI." *Computer Engineering and Technology (ICCET), 2010 2nd International Conference on*. vol. 2. IEEE, 6 pages.
Jianming, Wu., et al. "Performance Evaluation of Symbol-Wise XOR Based Bi-directional Relaying." *IEICE transactions on communications 92.5* (May 2009): pp. 1796-1807.

* cited by examiner

*Primary Examiner* — Kabir A Timory
(74) *Attorney, Agent, or Firm* — NSIP Law

(57) ABSTRACT

Provided is a relay node that performs network coding with respect to signals transmitted from a plurality of sources. The relay node may partition a plurality of constellation points into a plurality of subsets, generate a new constellation diagram based on respective characteristics among the plurality of subsets, and perform network coding based on the new constellation diagram.

21 Claims, 10 Drawing Sheets

COMMUNICATION METHOD OF RELAY NODE USING NON-LINEAR HYBRID NETWORK CODING AND DEVICE USING SAID METHOD

CROSS-REFERENCE TO RELATED APPLICATION(S)

This application claims the benefit under 35 U.S.C. §119(a) of Korean Patent Application No. 10-2011-0093574, filed on Sep. 16, 2011, in the Korean Intellectual Property Office, the entire disclosure of which is incorporated herein by reference for all purposes.

BACKGROUND

1. Field

The following description relates to a relay node that uses a non-linear hybrid network coding scheme.

2. Description of Related Art

A routing scheme is a process of selecting a path for transmission of data in a network. For example, the routing scheme may direct a logically addressed packet from a source to a destination via one or more relay nodes.

Network coding is a scheme in which a relay node of a network combines packets of information received as inputs, and transmits the combined packets of information as an output. This is different from a typical scheme in which a relay node simply relays packets when they are received. The network coding scheme is an advanced scheme derived from an existing routing scheme that merely transfers input information as output information. Accordingly, the network coding scheme may provide a higher and even a maximum possible transmission rate in a network.

The information transmission in a wireless network may be performed through a broadcasting scheme. According to the broadcasting scheme, information is transmitted to all nodes located in a range of transmission, and thus, a node that receives information could receive a signal formed of combined information when many nodes perform transmission simultaneously. In this example, if a receiving node desires to restore information sent by one node, information sent from the other nodes may act as interference.

In another example, there is a scheme that performs transmission using the interference between signals. This scheme is referred to as a physical layer network coding scheme.

According to the physical layer network coding scheme, a relay node receives a signal formed of combined information in a physical layer. The relay node may not demodulate the received information and may transmit, to another node, the received information as is. According to a general network coding scheme, a node may receive information piece by piece and may combine the information based on a coefficient of a local coding vector. On the other hand, the physical layer network coding scheme may utilize interference that occurs as a result of simultaneous transmission, by combining information.

SUMMARY

In one general aspect, there is provided a communication method of a relay node that performs network coding of a signal transmitted from a first source to a first destination and a signal transmitted from a second source to a second destination, the method including partitioning, into a plurality of subsets, a plurality of constellation points in a constellation diagram defined by a first constellation diagram used by the first source and a second constellation diagram used by the second source, generating a new constellation diagram from the constellation diagram based on characteristics of the plurality of subsets, and performing network coding based on the new constellation diagram.

The network coding may be performed according to a physical layer network coding scheme.

The partitioning may comprise obtaining information associated with the first constellation diagram and the second constellation diagram, estimating a first channel between the first source and the relay node, and a second channel between the second source and the relay node, generating the constellation diagram based on the first constellation diagram, the second constellation diagram, the first channel, and the second channel, and processing characteristics of the plurality of constellation points to partition the plurality of constellation points into the plurality of subsets.

The characteristics of the plurality of constellation points may include respective distances among the plurality of constellation points.

The generating may comprise calculating the new constellation diagram from the constellation diagram based on respective distances among the plurality of subsets.

The generating may comprise calculating the new constellation diagram from the constellation diagram based on the respective distances among the plurality of subsets and an average amount of power consumption corresponding to the new constellation diagram.

In another aspect, there is provided a communication method of a relay node that performs network coding of a signal transmitted from a first source to a first destination and a signal transmitted from a second source to a second destination, the method including accessing a memory that stores a codebook including a plurality of elements, selecting an element included in the codebook, based on a first channel between the first source and the relay node and a second channel between the second source and the relay node, partitioning a plurality of constellation points in a constellation diagram corresponding to a first constellation diagram used by the first source and a second constellation diagram used by the second source, into a plurality of subsets based on the selected element, selecting a new constellation diagram corresponding to the plurality of subsets based on the selected element, and performing network coding based on the new constellation diagram.

The selecting of the element may comprise estimating the first channel and the second channel, and processing the first channel and the second channel to select an element included in the codebook.

The partitioning may comprise obtaining information associated with the first constellation diagram and information associated with the second constellation diagram, generating the constellation diagram based on the selected element, the first constellation diagram, and the second constellation diagram, and processing the selected element to partition the plurality of constellation points into the plurality of subsets.

Each of the plurality of elements included in the codebook may indicate at least one of the first channel and the second channel, first constellation diagram candidates and second constellation diagram candidates, partitioning scheme candidates that perform partitioning of the plurality of constellation points in the constellation diagram corresponding to the first channel, the second channel, the first constellation diagram, and the second constellation diagram, into the plurality of subsets, and new constellation diagram candidates corresponding to the plurality of subsets.

The partitioning scheme candidates may be based on respective distances among the plurality of constellation points.

The new constellation diagram candidates may be based on respective distances among the plurality of subsets.

The new constellation diagram candidates may be based on respective distances among the plurality of subsets and an average amount of power consumption corresponding to the new constellation diagram.

In another aspect, there is provided a relay node that performs network coding of a signal transmitted from a first source to a first destination and a signal transmitted from a second source to a second destination, the relay node including a receiving unit to receive the signal transmitted from the first source and the signal transmitted from the second source, a partitioning unit to partition a plurality of constellation points in a constellation diagram defined by a first constellation diagram used by the first source and a second constellation diagram used by the second source, into a plurality of subsets, a constellation diagram generating unit to adaptively generate a new constellation diagram from the constellation diagram, based on characteristics of the plurality of subsets, a network coding unit to perform network coding based on the new constellation diagram, and a transmitting unit to transmit the network coded signal to the first destination and the second destination.

The network coding unit may be configured to perform network coding according to a physical layer network coding scheme.

In another aspect, there is provided a computer-readable storage medium having stored therein program instructions to cause a processor to execute communication method of a relay node that performs network coding of a signal transmitted from a first source to a first destination and a signal transmitted from a second source to a second destination, the method including partitioning, into a plurality of subsets, a plurality of constellation points in a constellation diagram that is based on a first constellation diagram used by the first source and a second constellation diagram used by the second source, generating a new constellation diagram from the constellation diagram based on characteristics of the plurality of subsets, and performing network coding based on the new constellation diagram.

In another aspect, there is provided a relay node including a partitioning unit configured to partition a plurality of constellation points into a plurality of subsets based on a spatial location of the plurality of constellation points, a generating unit configured to generate a new constellation diagram based on the partitioned plurality of subsets, and a network coding unit configured to perform network coding on a plurality of transmission signals based on the newly generated constellation diagram.

The generating unit may be configured to generate the new constellation diagram based on a distance between each of the plurality of subsets.

The relay node may further comprise a receiver configured to receive a first signal from a first source and to receive a second signal from a second source, wherein the partitioning unit is configured to obtain information associated with a first constellation diagram from the first signal and information associated with a second constellation diagram from the second signal, and the partitioning unit is further configured to partition the plurality of constellation points into the plurality of subsets based on the information associated with the first constellation diagram and the information associated with the second constellation diagram.

The partitioning unit may be configured to obtain the information associated with the first constellation diagram and the second constellation diagram from header information included in the first signal and the second signal, respectively.

The relay node may further comprise a transmitter configured to transmit the plurality of transmission signals that are network coded based on the newly generated constellation diagram, to their respective destinations.

Other features and aspects may be apparent from the following detailed description, the drawings, and the claims.

Figure 1:
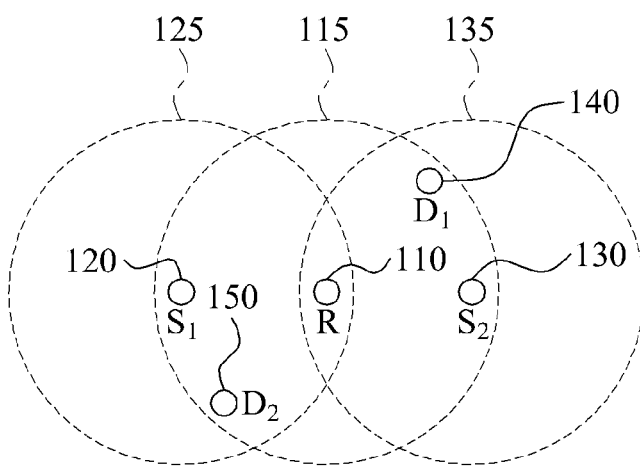
FIG. 1 is a diagram illustrating an example of a communication system of a relay node that performs network coding.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

As a non-exhaustive example only, a node, such as a relay node, a source node, and a destination node described herein, may refer to a terminal such as a smart phone, a computer, a router, a server, a tablet, and the like.

FIG. 1 illustrates an example of a communication system of a relay node 110 that performs network coding.

Referring to FIG. 1, a first source 120 is to transmit a signal to a first destination 140, and a second source 130 is to transmit a signal to a second destination 150. In this example, the first destination 140 is located outside of a transmission range 125 of the first source 120, and the second destination 150 is located beyond a transmission range 135 of the second source 130. Accordingly, the first destination 140 and the second destination 150 may not be able to receive signals transmitted from the first source 120 and the second source 130, directly.

In this example, the relay node 110 is located within the transmission range 125 of the first source 120 and the transmission range 135 of the second source 130. Accordingly, the relay node 110 may receive the signals transmitted from the first source 120 and the second source 130. In addition, the first destination 140 and the second destination 150 are within a transmission range 115 of the relay node 110. Accordingly, the first destination 140 and the second destination 150 may receive a signal transmitted from the relay node 110.

The relay node 110 may perform network coding with respect to the signal transmitted from the first source 120, and the signal transmitted from the second source 130, for the transmission to the first destination 140 and the second destination 150.

Figure 2:
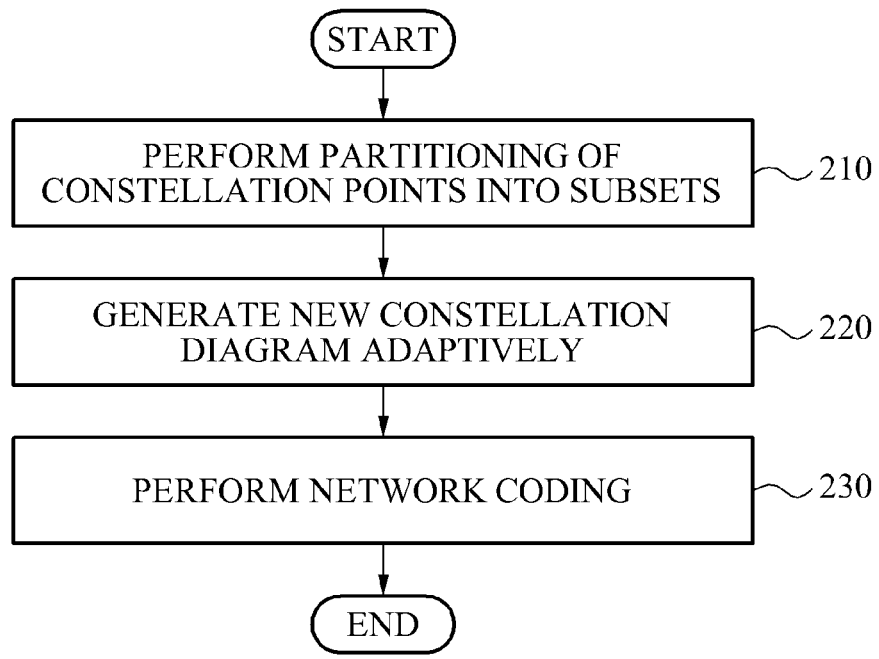
FIG. 2 is a flowchart illustrating an example of a communication method of a relay node that performs network coding.

FIG. 2 illustrates an example of a communication method of a relay node that performs network coding.

Referring to FIG. 2, in 210, a plurality of constellation points in a constellation diagram are partitioned into a plurality of subsets. The plurality of constellation points may be defined by a first constellation diagram used by a first source and a second constellation diagram used by a second source.

As described in the description of FIG. 1, the relay node 110 may receive the signal transmitted from the first source 120 and the signal transmitted from the second source 130, simultaneously or at separate times. In this example, a signal received by the relay node may be defined by the first constellation diagram used by the first source and the second constellation diagram used by the second source.

For example, the constellation diagram may show distance relations among a plurality of modulated digital signals. Modulated data, that is, a signal pattern, may be disposed as constellation points in a geometric plane, and a modulated carrier signal may be represented as a complex number such as I+jQ, using an In-phase (I) component and a quadrature (Q) component.

The constellation diagram defined by the first constellation diagram and the second constellation diagram may include a plurality of constellation points. Each of the plurality of constellation points may denote a superposition signal of a signal transmitted from the first source and a signal transmitted from the second source.

A destination may separate a superposition signal represented by each of the plurality of constellation points into a signal transmitted from the first source and a signal transmitted from the second source. A signal received by the relay node and the destination node may not be the same as one of the plurality of constellation points in the constellation diagram defined by the first constellation diagram and the second constellation diagram. The signal may have an error, based on a channel condition between a source and the relay node, the relay node and another relay node, and/or the relay node and the destination node, a signal transmission capability of the source node and the relay node, a reception capacity of the relay node and the destination node, and the like. In addition, if the relay node performs network coding using a physical layer network coding scheme, errors may be accumulated due to an increased number of relay nodes through which a signal passes.

The relay node that performs the network coding may overcome a drawback that is caused by the accumulation of the errors by partitioning the plurality of constellation points in the constellation diagram defined by the first constellation diagram and the second constellation diagram into a plurality of subsets, which is further described with reference to FIGS. 3 through 6.

In 220, a new constellation diagram is adaptively generated from the constellation diagram, based on respective characteristics among the plurality of subsets.

The communication method of the relay node may be a previous operation of the network coding. For example, if the relay node receives a signal from the first node and a signal from the second node, the relay node may generate the new constellation diagram to be used for adaptively transmitting to the first destination and/or the second destination.

When the plurality of constellation points are partitioned into one of the plurality of subsets through operation 210, a number of the constellation points in the constellation diagram may not be the same as a number of constellation points that the new constellation diagram requires. Accordingly, the relay node may generate the new constellation diagram from the constellation diagram adaptively, based on a number of the plurality of subsets created by the partitioning, that is, the number of the constellation points that are required by the new constellation diagram, or the respective characteristics among the plurality of subsets.

In 230, the relay node performs network coding based on the new constellation diagram. For example, network coding based on the new constellation diagram may be an operation of performing network coding using the new constellation diagram based on the physical layer network coding scheme.

The network coding using the new constellation diagram based on the physical layer network coding scheme may include an operation in which the relay node performs a one-to-one mapping of the plurality of subsets to the constellation points in the adaptively generated new constellation diagram. For example, the relay node may transmit independent signals corresponding to the plurality of subsets, respectively, using the new constellation diagram. In this example, the constellation points in the new constellation diagram may be one-to-one mapped to the plurality of subsets, and thus, the constellation points in the new constellation diagram may denote independent signals to be transmitted, by the relay node, with respect to the plurality of subsets.

Accordingly, the relay node may perform communication based on a network coding scheme by transmitting the independent signals corresponding to the plurality of subsets.

Figure 3:
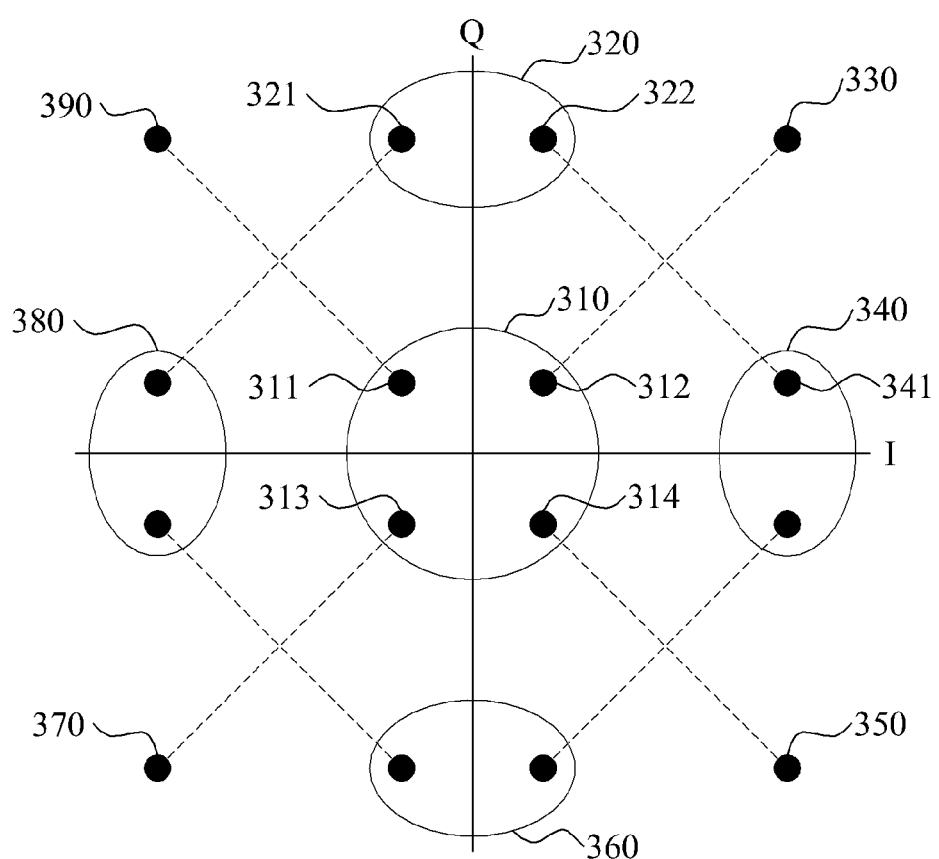
FIG. 3 is a diagram illustrating an example of an operation of partitioning a plurality of constellation points into a plurality of subsets.

FIG. 3 illustrates an example of an operation of partitioning a plurality of constellation points into a plurality of subsets.

Referring to FIG. 3, a relay node may receive signals corresponding to sixteen possible constellation points. As an example, a constellation diagram including the sixteen constellation points may be created based on a case in which both a first constellation diagram used by a first source for signal transmission and a second constellation diagram used by a second source for signal transmission are quadrature phase shift keying (QPSK) constellation diagrams, a signal transmitted from the first source is stronger than a signal transmitted from the second source, and no phase difference exists between the signal transmitted from the first source and the signal transmitted from the second source.

The QPSK scheme may transmit four types of digital symbols by a phase shift of 90 degrees for each, as opposed to a binary phase shift keying (PSK) scheme. A QPSK modulator may separate binary data into two independent channels, that is, an I channel and a Q channel, may perform amplitude-modulation of two carrier waves that have a phase difference of 90 degrees to be I channel binary data and Q channel binary data, and may combine the I channel binary data and Q channel binary data for transmission.

Based on an assumption that the signal transmitted from the first source is stronger than the signal transmitted from the second source, a quadrant of a constellation point corresponding to a signal received by the relay node may be determined by the signal transmitted from the first source. A location of the constellation point corresponding to the signal received by the relay node on the quadrant may be determined by the signal transmitted from the second source.

For example, if the signal transmitted from the first source is a signal located on a first quadrant of a QPSK constellation diagram used by the first source, the relay node may receive a signal corresponding to one of constellation points 330, 341, 312, and 322.

For example, if the signal transmitted from the first source is a signal located on the first quadrant on the QPSK constellation diagram used by the first source and the signal transmitted from the second source is a signal located on a first quadrant on a QPSK constellation diagram used by the second source, the relay node may receive a signal corresponding to constellation point 330.

As another example, if the signal transmitted from the first source is a signal located on the first quadrant on the QPSK constellation diagram used by the first source and the signal transmitted from the second source is a signal located on a second quadrant on the QPSK constellation diagram used by the second source, the relay node may receive a signal corresponding to constellation point 322.

As another example, if the signal transmitted from the first source is a signal located on the first quadrant on the QPSK constellation diagram used by the first source and the signal transmitted from the second source is a signal located on a third quadrant on the QPSK constellation diagram used by the second source, the relay node may receive a signal corresponding to constellation point 312.

As another example, if the signal transmitted from the first source is a signal located on the first quadrant on the QPSK constellation diagram used by the first source and the signal transmitted from the second source is a signal located on a fourth quadrant on the QPSK constellation diagram used by the second source, the relay node may receive a signal corresponding to constellation point 341.

Similarly, if the signal transmitted from the first source is a signal located on a second quadrant, a third quadrant, or a fourth quadrant on the QPSK constellation diagram used by the first source, a location of a corresponding constellation point may be determined in the same manner.

It may be difficult to distinguish constellation points received by the relay node from adjacent constellation points. For example, it may be difficult to distinguish constellation point 321 from constellation point 322. Similarly, constellation point 311, constellation point 312, constellation point 313, and constellation point 314 are each close to one another and may be difficult to be distinguished from each other. Conversely, constellation point 330, constellation point 350, constellation point 370, and constellation point 390 are located significantly far apart from remaining constellation points in the constellation diagram, and thus, may be clearly distinguished from the remaining constellation points.

In various examples, the relay node may classify constellation points that are disposed too close to each other to be distinguished from one another, as an independent subset for partitioning. For example, constellation point 321 and the constellation point 322 may be partitioned as a subset 320, and constellation point 311, constellation point 312, constellation point 313, and constellation point 314 may be partitioned as a subset 310. Also, constellation point 330, constellation point 350, constellation point 370, and constellation point 390 that are clearly distinguishable from the remaining constellation points may form subsets, respectively.

Accordingly, the relay node may perform partitioning of the constellation points into a plurality of subsets 310, 320, 330, 340, 350, 360, 370, 380, and 390.

Figure 4:
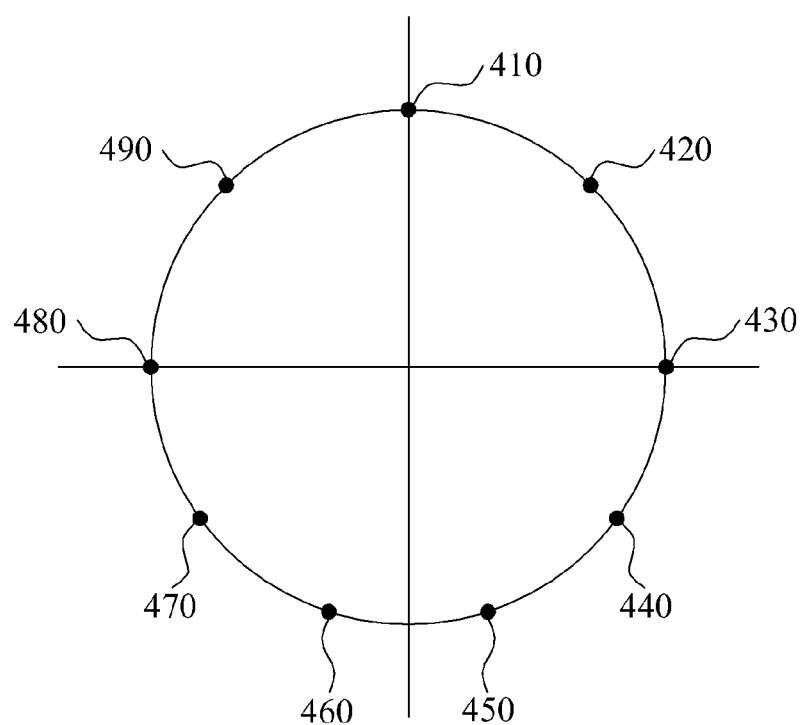
FIG. 4 is a diagram illustrating an example of an operation of adaptively generating a new constellation diagram.

FIG. 4 illustrates an example of an operation of adaptively generating a new constellation diagram.

Referring to FIG. 4, a relay node may generate a 9-PSK constellation diagram to be used for the relay node to transmit a network coded signal. The 9-PSK constellation diagram may be generated by partitioning sixteen constellation diagram points into nine subsets. As an example, the constellation diagram may be generated based on a case in which both a first constellation diagram used by a first source and a second constellation diagram used by a second source are QPSK constellation diagrams, a signal transmitted from the first source is stronger than a signal transmitted from the second source, and no phase difference exists between the signal transmitted from the first source and the signal transmitted from the second source.

The relay node may perform network coding of the signal transmitted from the first source and the signal transmitted from the second source using the new 9-PSK constellation diagram, and may perform communication. For example, the relay node may perform network coding to one-to-one map the subsets 310, 320, 330, 340, 350, 360, 370, 380, and 390 to constellation points 410, 420, 430, 440, 450, 460, 470, 480, and 490 in the new constellation diagram.

In this example, the generating of the new constellation diagram may include an operation of calculating the new constellation diagram, adaptively, from a constellation diagram defined by the first constellation diagram and the second constellation diagram based on respective distances among the plurality of subsets. For example, the one-to-one mapping of the subsets 310, 320, 330, 340, 350, 360, 370, 380, and 390 to constellation points 410, 420, 430, 440, 450, 460, 470, 480, and 490 in the new constellation diagram may be performed based on the respective distances among the subsets.

In this example, the subsets 330, 350, 370, and 390 have the longest distances among the respective distances among the subsets. Accordingly, the subsets 330, 350, 370, and 390 may be one-to-one mapped to the constellation points 420, 440, 470, and 490 in the new constellation diagram to have the longest distances among the respective displaces among the subsets.

In this example, subset 320 is located between the subset 390 and the subset 330, the subset 340 is located between the subset 330 and the subset 350, and the subset 380 is located between the subset 390 and the subset 370. Accordingly, the subsets 320, 340, and 380 may be one-to-one mapped to the constellation points 410, 430, and 480 in the new constellation diagram of FIG. 4.

In addition, the subsets 360 and 310 are located between the subset 370 and the subset 350. Accordingly, the subsets 360 and 310 may be one-to-one mapped to the constellation points 450 and 460 in the new constellation diagram of FIG. 4.

The operation of generating the new constellation diagram based on the respective distances among the plurality of subsets may adaptively generate the new constellation diagram based on respective squared Euclidean distances among the plurality of subsets.

As another example, the generating the new constellation diagram may include an operation of calculating the new constellation diagram from the constellation diagram, based on the distances among the plurality of subsets and an average amount of power consumption corresponding to the new constellation diagram. If the relay node transmits a signal based on the adaptively generated new constellation diagram, the average amount of power consumption may be different for each type of used constellation diagram. The operation of generating the new constellation diagram adaptively may include an operation of calculating the new constellation diagram based on the respective distances among the plurality of subsets and the average amount of power consumption.

Figure 5:
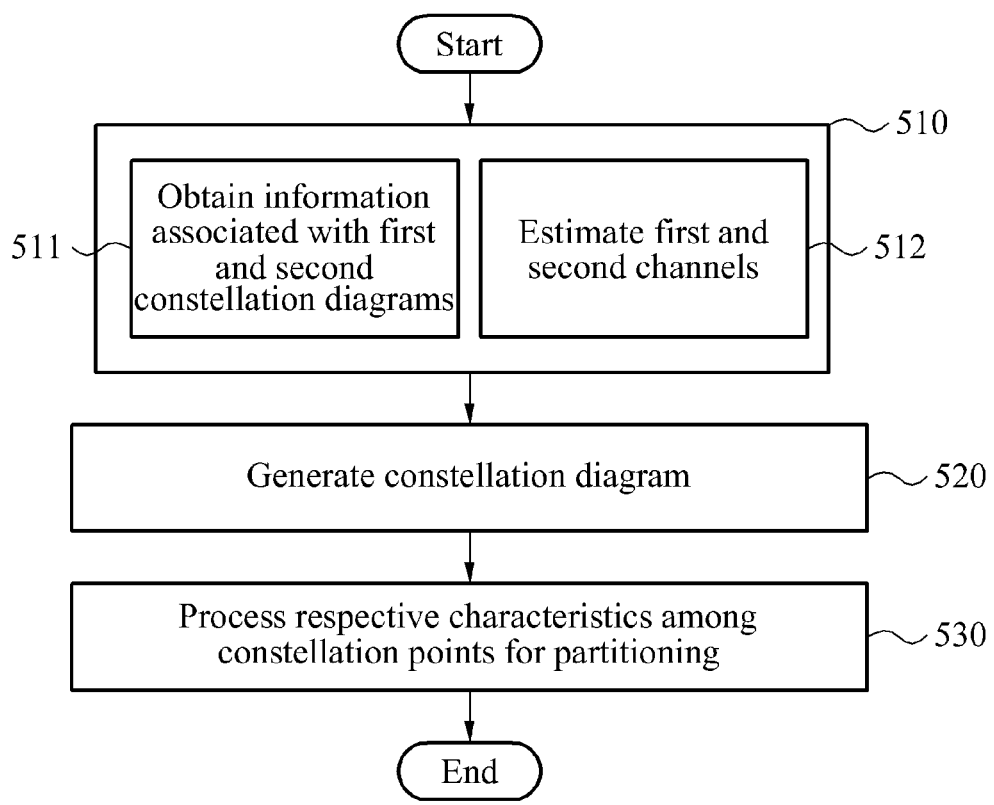
FIG. 5 is a flowchart illustrating an example of an operation of partitioning a plurality of constellation points into a plurality of subsets.

FIG. 5 illustrates an example of an operation of partitioning a plurality of constellation points into a plurality of subsets.

Referring to FIG. 5, in 511, information associated with a first constellation diagram and information associated with a second constellation diagram is obtained.

For example, the information associated with the first constellation diagram used by a first source and the information associated with the second constellation diagram used by a second source, may be obtained based on header information included in a signal transmitted from the first source and header information included in a signal transmitted from the second source.

The relay node may further include, in the header information, information associated with a new constellation diagram used when a network coded signal is transmitted to another relay node or to a destination. Accordingly, a history of information associated with constellation diagrams used for signals transmitted from a source to the destination may be accumulated in the header. In this example, the history of the information associated with the constellation diagrams accumulated in the header may be encoded to reduce a capacity of the header for transmission.

In 512, a first channel between the first source and the relay node and a second channel between the second source and the relay node are estimated. For example, the relay node may respectively estimate the first channel and the second channel using a pilot signal transmitted from the first source and a pilot signal transmitted from the second source.

The pilot signal may be a high output signal, which is transmitted continuously from a wireless communication base station, so as to enable a mobile station, that is, a receiving end, to readily perform phase synchronization with a carrier wave, obtain base station information, and the like.

The first channel and the second channel may represent wireless channel information, for example, an attenuation, a phase deviation, a time-delay, and the like. The channel estimation may refer to estimating of a magnitude of a carrier wave affected by a channel and a reference phase. A wireless channel environment may have a fading characteristic corresponding to a phenomenon in which a channel condition irregularly varies in a time domain and a frequency domain, over time. Accordingly, estimating of an amplitude, a phase, and the like of a channel may be referred to as the channel estimation. Furthermore, the channel estimation may refer to estimating of a frequency response of a wireless channel.

A method of estimating the first channel and the second channel may include estimating a reference value from a pilot signal based on pilot values of a few base stations, and estimating a channel based on a pilot symbol that a transmitting end and a receiving end are commonly aware of. The estimating may be performed by a two-dimensional (2D) channel estimator.

Operation 511 for obtaining the information associated with the first constellation diagram and the information associated with the second constellation diagram, and operation 512 for estimating the first channel between the first source and the relay node and the second channel between the second source and the relay node may be performed simultaneously in a single operation as represented by operation 510.

In 520, a constellation diagram is generated based on the first constellation diagram, the second constellation diagram, the first channel, and the second channel. In 530, characteristics of the plurality of constellation points are processed, so as to partition the plurality of constellation points in the constellation diagram into the plurality of subsets. An example of the processing is described with reference to FIG. 6.

Figure 6:
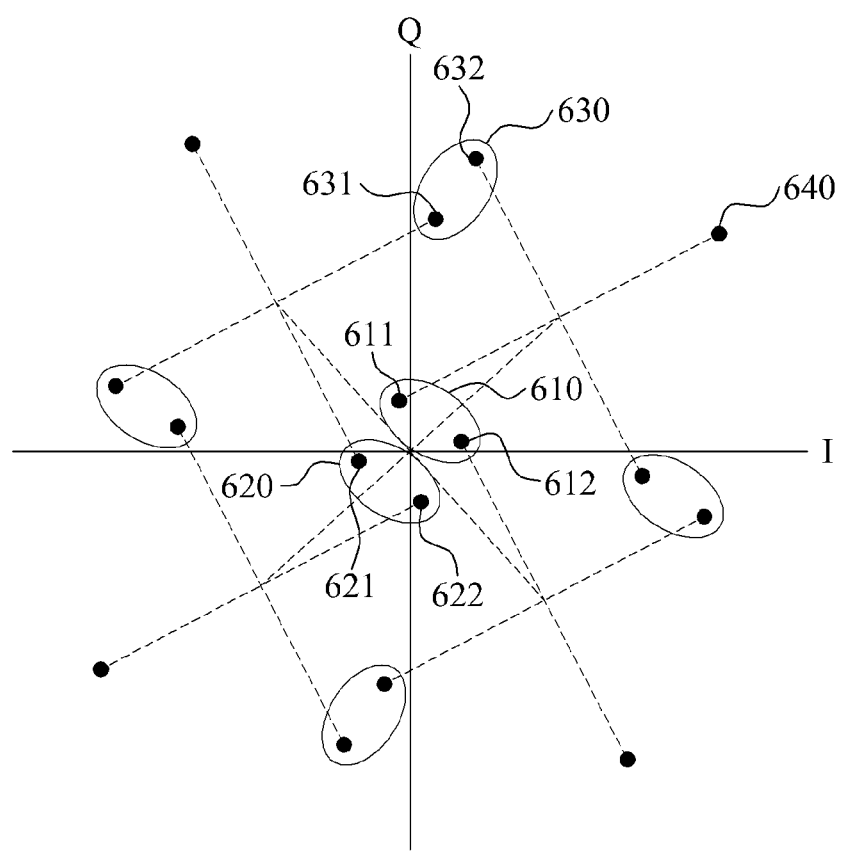
FIG. 6 is a diagram illustrating an example of a method of processing characteristics of a plurality of constellation points so as to perform partitioning of the plurality of constellation points into a plurality of subsets.

FIG. 6 illustrates an example of a method of processing characteristics of a plurality of constellation points so as to partition the plurality of constellation points into a plurality of subsets.

Referring to FIG. 6, the relay node may receive signals corresponding to sixteen constellation points. For example, a constellation diagram including the sixteen constellation points may be generated based on a case in which a first constellation diagram used by a first source for signal transmission and a second constellation diagram used by a second source for signal transmission are QPSK constellation diagrams, a signal transmitted from the first source is stronger than a signal transmitted from the second source, and a phase difference of 100 degrees exists between the signal transmitted from the first source and the signal transmitted from the second source.

As described with reference to FIG. 5, operation 512 for estimating the first channel and the second channel may estimate the first channel and the second channel using a pilot signal, and thus, may obtain information associated with an attenuation, a phase deviation, and the like of the signal transmitted from the first source and the signal transmitted from the second source. In this example, the constellation diagram of FIG. 6 may be obtained if the signal transmitted from the first source is stronger than the signal transmitted from the second source and the phase difference between both signals is 100 degrees as a result of the estimation of the first channel and the second channel. In addition, operation 511 may use header information to obtain the information associated with the first constellation diagram and the information associated with the second constellation diagram. Accordingly, in 520, the relay node may generate, in an on-line state, a constellation diagram similar to the constellation diagram of FIG. 6.

In 530, the communication method of the relay node may process respective characteristics of the plurality of constellation points so as to partition the plurality of constellation points in the constellation diagram into the plurality of subsets.

The characteristics of the plurality of constellation points may include respective distances among the plurality of the constellation points. The examples described with reference to FIG. 3 are applicable to the operation of generating the constellation diagram of FIG. 6 based on the respective distances among the plurality of constellation points, however, additional descriptions thereof are omitted for conciseness.

As a result of the processing of the characteristics of the plurality of constellation points for the partitioning in 530, a constellation point 631 and a constellation point 632 may be partitioned into a subset 630, a constellation point 611 and a constellation point 612 may be partitioned into a subset 610, and a constellation point 621 and a constellation point 622 may be partitioned into a subset 620. A constellation point 640 may be clearly distinguished from remaining constellation points, and thus, may form a subset by itself.

Figure 7:
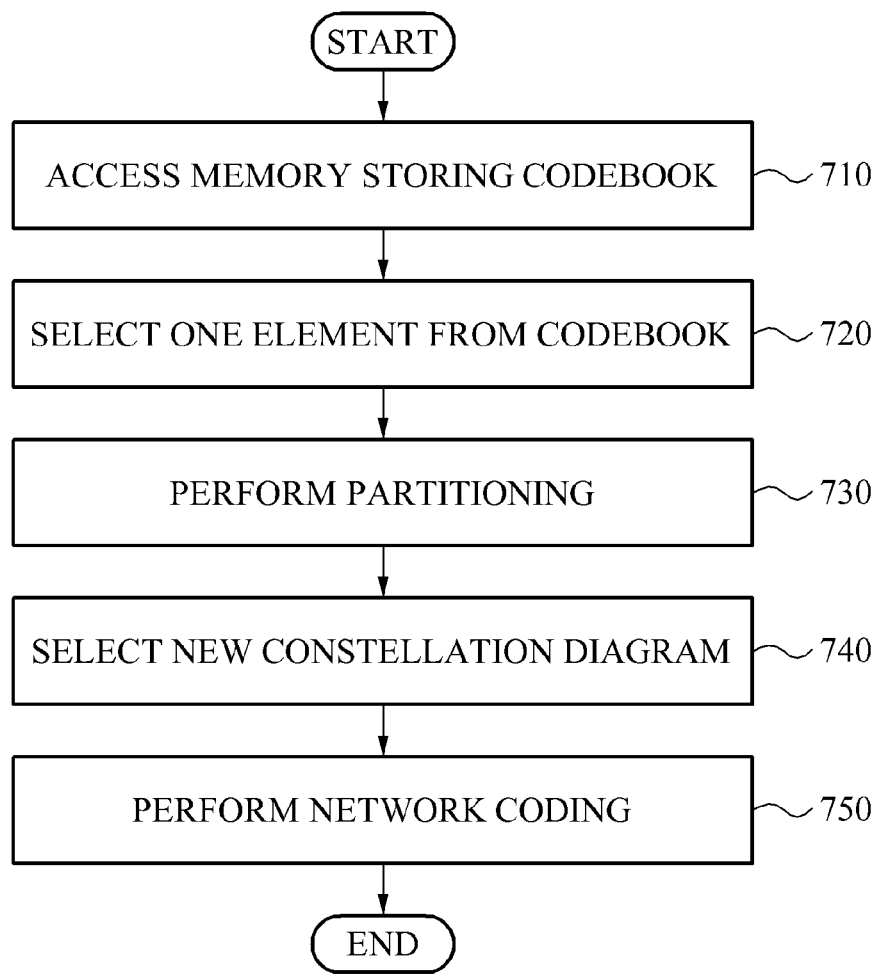
FIG. 7 is a flowchart illustrating an example of a communication method of a relay node that performs network coding based on a codebook.

FIG. 7 illustrates an example of a communication method of a relay node that performs network coding based on a codebook.

Referring to FIG. 7, in 710, the relay node accesses a memory storing a codebook including a plurality of elements.

For example, the constellation diagram of FIG. 6 may be generated based on a first channel and a second channel, and thus, as many constellation diagrams as a number of combinations of a first channel and a second channel may be generated. A wireless channel environment may have a fading phenomenon in which a channel condition varies in a time domain and a frequency domain, irregularly, over time, and thus, the number of combinations may be substantially infinite.

The codebook used by the relay node may quantize the infinite number of combinations to a finite number of combinations, and may store information for network coding. For example, the relay node may utilize a codebook based on a Lloyd algorithm to perform the quantization. The Lloyd algorithm is an algorithm that groups a plurality of data points into a given number of categories, and may minimize a dispersion of respective distance differences among the categories.

The codebook used by the relay node for network coding may calculate and store the information for network coding with respect to the finite number of combinations of the first channel and the second channel. For example, the codebook may calculate and store the information for network coding in advance based on the Lloyd algorithm. An example of the plurality of elements that may be included in the codebook are described with reference to FIGS. 9 and 10.

In 720, the relay node selects one of the elements included in the codebook, based on the first channel between a first source and the relay node and the second channel between a second source and the relay node.

The selecting one element may include estimating the first channel and the second channel, and processing the first channel and the second channel to select one element from the codebook including the plurality of elements. For example, the estimating of each of the first channel and the second channel may be estimated based on a respective pilot signal.

The codebook may store the information for network coding with respect to the finite number of combinations of the first channel and the second channel, quantized based on the Lloyd algorithm. Accordingly, one of the quantized finite number of combinations may be selected using the first channel and the second channel that are estimated using the pilot signal. In addition, one element corresponding to the selected combination of the first channel and the second channel may be selected from the codebook including the plurality of elements, based on the selected combination of the first channel and the second channel.

In 730, the relay node partitions, based on the selected element, a plurality of constellation points in a constellation diagram into a plurality of subsets. The constellation diagram may correspond to a first constellation diagram used by the first source and a second constellation diagram used by the second source.

The partitioning may include obtaining information associated with the first constellation diagram and information associated with the second constellation diagram, and generating the constellation diagram based on the selected element, the first constellation diagram, and the second constellation diagram, and processing the selected element so as to partition the plurality of constellation points in the constellation diagram into the plurality of subsets.

The example described with reference to FIG. 6 may be applicable to the operation of obtaining the information associated with the first constellation diagram and the second constellation diagram. In addition, the relay node may obtain information associated with a codebook label used when the signal transmitted from the first source passes through another relay node and information associated with a codebook label used when the signal transmitted from the second source passes through another relay node, in addition to the information associated with the first constellation diagram used by the first source and the information associated with the second constellation diagram used by the source node. The information associated with the codebook label, the information associated with the first constellation diagram, and/or the information associated with the second constellation diagram may be obtained using header information included in a signal transmitted from the first source and header information included in a signal transmitted from the second source.

Although the relay node receives a signal transmitted via another relay node, the relay node may obtain information associated with a source from which the signal is originally transmitted. In this example, the relay node may further include, in header information, information associated with a new constellation diagram used when a network coded signal is transmitted to another relay node or to a destination, information associated with a source from which the signal is originally transmitted, and/or information associated with a codebook label used when the signal passes through another relay node, and the like.

The selected element may include information associated with the first channel and information associated with the second channel. Accordingly, the example described with reference to FIG. 3 is applicable to operation 730 of partitioning the plurality of constellation points into the plurality of subsets based on the selected element.

In 740, the relay node selects a new constellation diagram corresponding to the plurality of subsets, based on the selected element, examples of which are described with reference to FIGS. 8 through 9.

In 750, the relay node performs network coding based on the new constellation diagram. The examples with reference to FIGS. 2 through 4 are applicable to operation 750.

Figure 8:
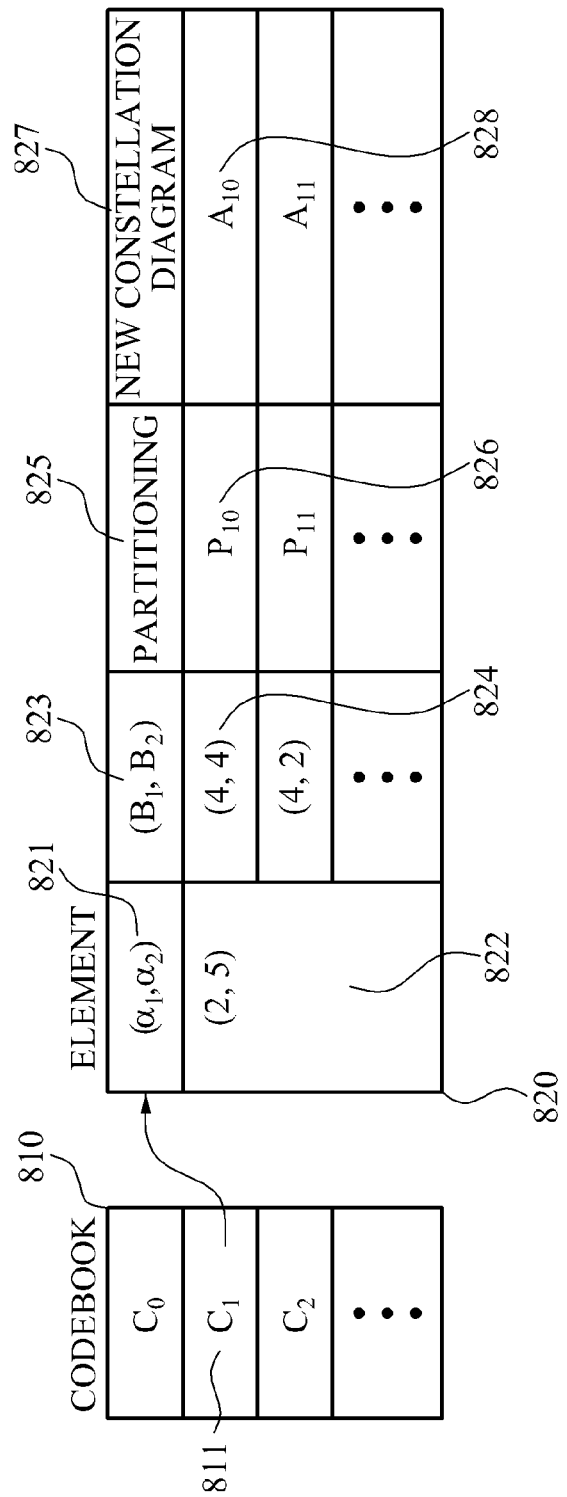
FIG. 8 is a diagram illustrating an example of a plurality of elements included in a codebook.

FIG. 8 illustrates an example of a plurality of elements included in a codebook.

Referring to FIG. 8, codebook 810 includes a plurality of elements 820, each of which indicates at least one of a combination 821 of a first channel and a second channel, combinations 823 of a first constellation diagram candidate and a second constellation diagram candidate, partitioning scheme candidates 825 that perform partitioning of a plurality of constellation points in a constellation diagram corresponding to the first channel, the second channel, a corresponding first constellation diagram, and a corresponding second constellation diagram, into a plurality of subsets, and new constellation diagram candidates 827 corresponding to the plurality of subsets.

For example, a second element ($C_1$) 811 among the plurality of elements 820 included in the codebook 810 has a value 822 of (2, 5) as the combination 821 of a first channel and a second channel. The value 822 of (2, 5) may be one of finite number of combinations of a first channel and a second channel that are stored in the codebook 810 after quantization based on the Lloyd algorithm.

In this example, $C_1$ 811 has values 824 of (4, 4), (4, 2), and the like as the combinations 823 of a first constellation diagram candidate and a second constellation diagram candidate. The value of (4, 4) may represent that a first constellation diagram is a QPSK constellation diagram and a second constellation diagram is a QPSK constellation diagram.

In addition, $C_1$ 811 has values 826 of $P_{10}$, $P_{11}$, and the like as the partitioning scheme candidates 825. Here, "10" in "$P_{10}$" may denote a binary index indicating first partitioning information of $C_1$ 811. The partitioning scheme candidates 825 may be based on respective distances among the plurality of constellation points. An example of partitioning information represented by an element of a codebook is described with reference to FIG. 9.

In various examples, partitioning scheme candidates that are based on the respective distance among the plurality of constellation points may be based on respective squared Euclidean distances among the plurality of constellation points.

In addition, $C_1$ 811 has values 828 of $A_{10}$, $A_{11}$, and the like as the new constellation diagram candidates 827. Here, "10" in "$A_{10}$" may denote a binary index indicating first new constellation diagram information of $C_1$ 811.

In various examples, new constellation diagram candidates may be based on the respective distance among the plurality of subsets, and may further be based on an average amount of power consumption corresponding to the new constellation diagram.

The new constellation diagram candidates that are based on the respective distances among the plurality of subsets or the new constellation diagram candidates that are based on the respective distances among the plurality of subsets and the average amount of power consumption may be calculated in advance. The calculation may be understood based on the example described with reference to FIGS. 2 through 4.

Figure 9:
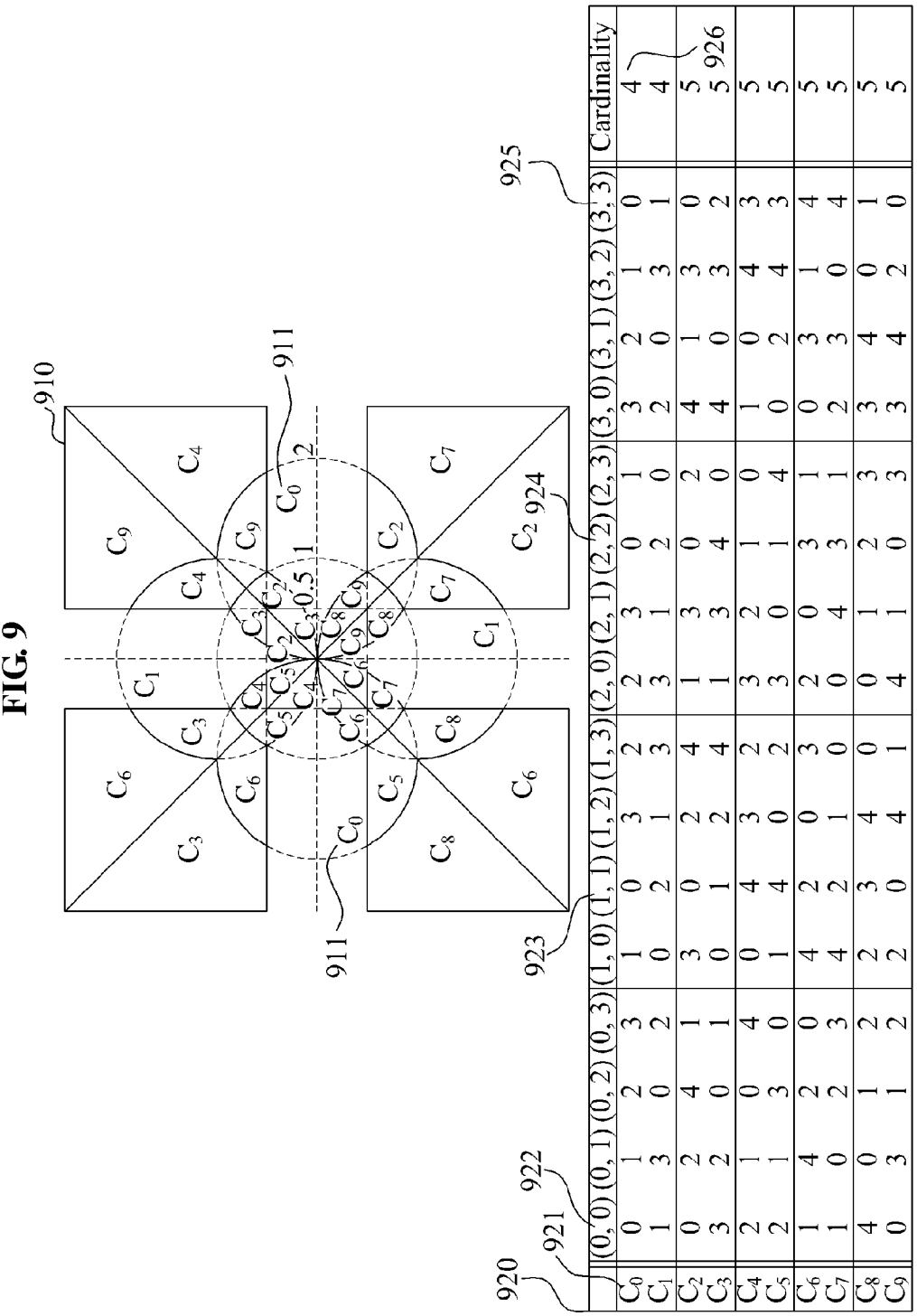
FIG. 9 is a diagram illustrating an example of information associated with partitioning and a codebook label among elements included in a codebook.

FIG. 9 illustrates an example of information associated with partitioning and a codebook label among elements included in a codebook.

Referring to FIG. 9, a result 910 of quantization of combinations of a first channel and a second channel into finite number of combinations based on the Lloyd algorithm may is illustrated on a 2D plane. A relay node may quantize the combinations of a first channel and a second channel into the finite number of combinations, based on a relative ratio of the first channel to the second channel.

For example, if the relative ratio of the first channel to the second channel, estimated by the relay node, corresponds to an area occupied by a first element ($C_0$) 911 on the 2D plane illustrated based on the result of the quantization, partitioning may be performed by $C_0$ 911 among the elements included in the codebook.

Partitioning scheme candidates that are represented by each element included in the codebook, which partition the plurality of constellation points in a constellation diagram into a plurality of subsets, may be expressed by an arrangement including elements of integers as shown in table 920.

For example, if partitioning is performed based on $C_0$ 921 which is a first element among the elements included in the codebook, a cardinality has a value 926 of 4, and thus, the plurality of constellation points may be classified into four subsets and the four subsets may be expressed by integers in a range of 0 through 3.

In this example, each column included in the table 920 expressed by an arrangement including elements of integers may denote a corresponding constellation point of the plurality of constellation points in the constellation diagram.

For example, a column 922 of (0, 0) may denote a constellation point if the relay node receives a signal obtained by transposing a signal transmitted from a first source to a location of "0" in a constellation diagram used by the first source, and receives a signal obtained by transposing a signal transmitted from a second source to a location of "0" in a constellation diagram used by the second source.

In this example, a column of (0, 1) may denote a constellation point if the relay node receives the signal obtained by transposing the signal transmitted from the first source to the location of "0" in the constellation diagram used by the first source, and receives a signal obtained by transposing the signal transmitted from the second source to a location of "1" in the constellation diagram used by the second source.

If the partitioning is performed based on $C_0$ 921, the column 922 of (0, 0), a column 923 of (1, 1), a column 924 of (2, 2), and a column 925 of (3, 3) may have a value of 0 as an integer value of a partitioned subset and thus, the four constellation points may be classified as the same subset.

In this example, constellation points of (0, 1), (1, 0), (2, 3), and (3, 2), constellation points of (0, 2), (1, 3), (2, 0), and (3, 1), and constellation points of (0, 3), (1, 2), (2, 1), and (3, 0) may be classified as the same subsets, respectively.

Figure 10:
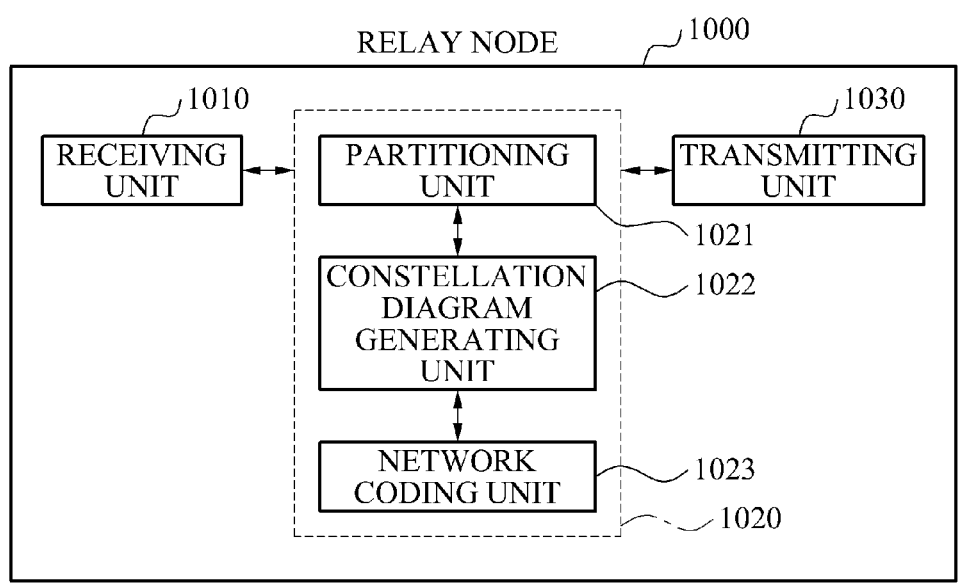
FIG. 10 is a diagram illustrating an example of a relay node that performs network coding.

FIG. 10 illustrates an example of a relay node that performs network coding.

Referring to FIG. 10, relay node 1000 includes a receiving unit 1010 to receive a signal transmitted from a first source and a signal transmitted from a second source, a partitioning unit 1021 to perform partitioning, into a plurality of subsets, of a plurality of constellation points in a constellation diagram defined by a first constellation diagram used by the first source and a second constellation diagram used by the second source, a constellation diagram generating unit 1022 to generate a new constellation diagram from the constellation diagram, adaptively, based on characteristics among the plurality of subsets, a network coding unit 1023 to perform network coding based on the new constellation diagram, and a transmitting unit 1030 to transmit the network coded signal to a first destination and a second destination.

The partitioning unit 1021, the constellation diagram generating unit 1022, and the network coding unit 1023, or a combination thereof may be processed by a single processor.

The examples described with reference to FIGS. 1 through 9 are applicable to relay node 1000 of FIG. 10, and thus, additional descriptions thereof is omitted for conciseness.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method executed by a relay node that performs network coding of a signal transmitted from a first source to a first destination and a signal transmitted from a second source to a second destination, the method comprising:
   receiving the signals transmitted from the first and second sources;
   partitioning, into a plurality of subsets, a plurality of constellation points in a constellation diagram defined by a first constellation diagram used by the first source and a second constellation diagram used by the second source;
   generating a new constellation diagram from the constellation diagram based on characteristics of the plurality of subsets, the new constellation diagram having different constellation points than the constellation diagram; and
   performing network coding of the received signals based on the new constellation diagram.

2. The method of claim 1, wherein the network coding is performed according to a physical layer network coding scheme.

3. The method of claim 1, wherein the partitioning comprises:
   obtaining information associated with the first constellation diagram and the second constellation diagram;
   estimating a first channel between the first source and the relay node and a second channel between the second source and the relay node;
   generating the constellation diagram based on the first constellation diagram, the second constellation diagram, the estimated first channel, and the estimated second channel; and
   processing characteristics of the plurality of constellation points for use in partitioning the plurality of constellation points into the plurality of subsets.

4. The method of claim 3, wherein the characteristics of the plurality of constellation points include respective distances among the plurality of constellation points.

5. The method of claim 1, wherein the generating comprises calculating the new constellation diagram from the constellation diagram based on respective distances among the plurality of subsets.

6. The method of claim 1, wherein the generating comprises calculating the new constellation diagram from the constellation diagram based on respective distances among the plurality of subsets and an average amount of power consumption corresponding to the new constellation diagram.

7. A communication method executed by a relay node that performs network coding of a signal transmitted from a first source to a first destination and a signal transmitted from a second source to a second destination, the method comprising:
   receiving the signals from the first and second sources;
   accessing a memory that stores a codebook including a plurality of elements;
   selecting an element included in the codebook, based on a characteristic of a first channel between the first source and the relay node and a characteristic of a second channel between the second source and the relay node;
   partitioning a plurality of constellation points in a constellation diagram, corresponding to a first constellation diagram used by the first source and a second constellation diagram used by the second source, into a plurality of subsets based on the selected element;
   selecting a new constellation diagram corresponding to the plurality of subsets based on the selected element, the new constellation diagram having different constellation points than the constellation diagram; and
   performing network coding of the received signals based on the new constellation diagram.

8. The method of claim 7, wherein the selecting of the element comprises:
   estimating the first channel and the second channel; and
   processing the estimates of the first channel and the second channel for use in selecting an element included in the codebook.

9. The method of claim 7, wherein the partitioning comprises:
   obtaining information associated with the first constellation diagram and information associated with the second constellation diagram;
   generating the constellation diagram based on the selected element, the information of the first constellation diagram, and the information of the second constellation diagram; and
   processing the selected element for use in partitioning the plurality of constellation points into the plurality of subsets.

10. The method of claim 7, wherein each of the plurality of elements included in the codebook indicates at least one of:
information of the first channel and the second channel,
first constellation diagram candidates and second constellation diagram candidates,
partitioning scheme candidates that perform partitioning of the plurality of constellation points in the constellation diagram corresponding to the first channel, the second channel, the first constellation diagram, and the second constellation diagram, into the plurality of subsets, and
new constellation diagram candidates corresponding to the plurality of subsets.

11. The method of claim 10, wherein the partitioning scheme candidates are based on respective distances among the plurality of constellation points.

12. The method of claim 10, wherein the new constellation diagram candidates are based on respective distances among the plurality of subsets.

13. The method of claim 10, wherein the new constellation diagram candidates are based on respective distances among the plurality of subsets and an average amount of power consumption corresponding to the new constellation diagram.

14. A relay node that performs network coding of a signal transmitted from a first source to a first destination and a signal transmitted from a second source to a second destination, the relay node comprising:
a receiving unit configured to receive the signal transmitted from the first source and the signal transmitted from the second source;
a partitioning unit configured to partition a plurality of constellation points in a constellation diagram defined by a first constellation diagram used by the first source and a second constellation diagram used by the second source, into a plurality of subsets;
a constellation diagram generating unit configured to adaptively generate a new constellation diagram from the constellation diagram, based on characteristics of the plurality of subsets, the new constellation diagram having different constellation points than the constellation diagram;
a network coding unit configured to perform network coding of the received signals based on the new constellation diagram; and
a transmitting unit configured to transmit the network coded signals to the first destination and the second destination.

15. The relay node of claim 14, wherein the network coding unit is configured to perform network coding according to a physical layer network coding scheme.

16. A non-transitory computer-readable storage medium having stored therein program instructions to cause a processor to execute a communication method of a relay node that performs network coding of a signal transmitted from a first source to a first destination and a signal transmitted from a second source to a second destination, the method comprising:
receiving the signals transmitted from the first and second sources;
partitioning, into a plurality of subsets, a plurality of constellation points in a constellation diagram that is based on a first constellation diagram used by the first source and a second constellation diagram used by the second source;
generating a new constellation diagram from the constellation diagram based on characteristics of the plurality of subsets, the new constellation diagram having different constellation points than the constellation diagram; and
performing network coding of the received signals based on the new constellation diagram.

17. A relay node comprising:
a receiver configured to receive a first signal from a first source and to receive a second signal from a second source;
a partitioning unit configured to partition a plurality of constellation points of a constellation diagram into a plurality of subsets based on a spatial location of the plurality of constellation points;
a generating unit configured to generate a new constellation diagram based on the partitioned plurality of subsets, the new constellation diagram having different constellation points than the constellation diagram; and
a network coding unit configured to perform network coding on a plurality of transmission signals based on the newly generated constellation diagram, wherein
the partitioning unit is further configured to partition the plurality of constellation points into the plurality of subsets based on information associated with a first constellation diagram used by the first source and information associated with a second constellation diagram used by the second source.

18. The relay node of claim 17, wherein the generating unit is configured to generate the new constellation diagram based on a distance between each of the plurality of subsets.

19. The relay node of claim 17, wherein the partitioning unit is further configured to obtain the information associated with the first constellation diagram from the first signal and the information associated with the second constellation diagram from the second signal.

20. The relay node of claim 19, wherein the partitioning unit is configured to obtain the information associated with the first constellation diagram and the second constellation diagram from header information included in the first signal and the second signal, respectively.

21. The relay node of claim 17, further comprising a transmitter configured to transmit the plurality of transmission signals that are network coded based on the newly generated constellation diagram, to their respective destinations.

* * * * *